March 4, 1947.  E. P. KINNE  2,416,928

DRAFT GEAR

Filed Nov. 26, 1943  3 Sheets-Sheet 1

INVENTOR.
Edmund P. Kinne,
BY
Atty.

March 4, 1947.   E. P. KINNE   2,416,928
DRAFT GEAR
Filed Nov. 26, 1943   3 Sheets-Sheet 2
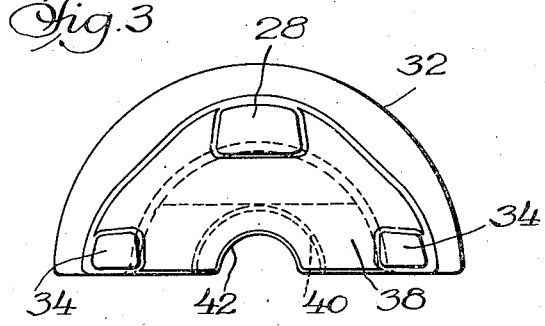
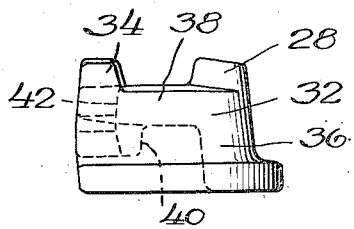
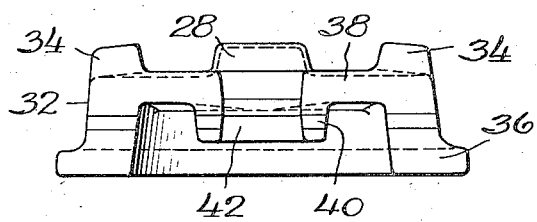
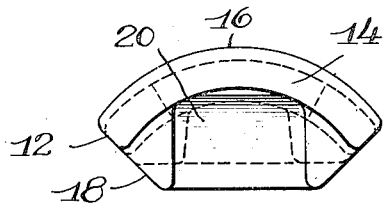
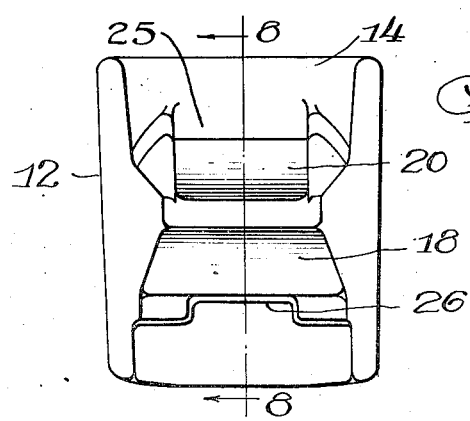
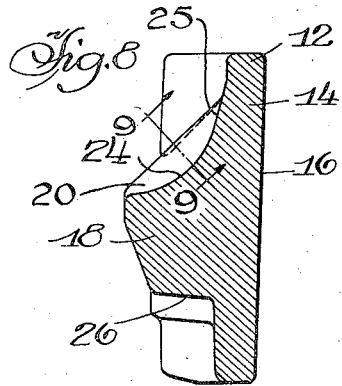
INVENTOR.
Edmund P. Kinne,
BY March 4, 1947.  E. P. KINNE  2,416,928
DRAFT GEAR
Filed Nov. 26, 1943  3 Sheets-Sheet 3

INVENTOR.
Edmund P. Kinne
BY
Atty follower 114, said wedge follower being in complementary wedge engagement at 116 with the other shoes 106, 106.

Seated on the telescoped compression springs 117 and 118 is a spring cap 120 having a flat outer surface 122, against which is seated the bearing pads 124, 124 of the equalizer members 126, 126, said members being rockable against said cap 120 by means of the bearing pads 124, 124. Each equalizer member 126 comprises on its outer face the bearer 128 received within a complementary recess 130 of one of the friction shoes for engagement therewith at 132.

At each end thereof, each equalizer member is provided with the bearer 134, a pair of bearers 134, 134 on the respective members 126, 126 being engaged with each of the associated shoes as in the previously described embodiments. The adjacent edges of the members 126, 126 are afforded arcuate recesses 136, 136 defining an opening for the reception of the auxiliary release spring 138 compressed at its outer end at 140 against the follower 114 and seated at its inner end at 142 against the spring cap 120.

The arrangement illustrated in Figure 11 is identical with that shown in Figure 10 except for the provision of the auxiliary release spring 138, which is arranged in series with the compression springs 118, 118 and is operable to facilitate release of the wedge follower 114 by breaking its contact with the friction shoes.

It is to be understood that I do not wish to be limited by the exact embodiments of the device shown which are merely by way of illustration and not limitation as various and other forms of the device will, of course, be apparent to those skilled in the art without department from the spirit of the invention or the scope of the claims.

I claim:

1. In a draft gear, a housing having an open end with an internal friction surface flaring toward said end, a plurality of friction shoes engaging said surface, a compression spring, a spring cap thereon, an equalizer seated on said cap and bearing against said shoes, a wedge insert recessed in one of said shoes and presenting a wedge surface, wedge surfaces on the other of said shoes, and an outer wedge follower in complementary wedge engagement with all of the said wedge surfaces, all of said wedge surfaces being at approximately the same angle with respect to the axis of the gear, said insert being seated against an arcuate face on its associated shoe, said arcuate face being so formed and arranged that the extremity thereof closest to the open end of said housing is farther from the longitudinal axis of the gear than any other portion of said arcuate face.

2. In a draft gear, a friction housing with an open end, friction surfaces within said housing, friction shoes engaging said surfaces, a compression spring within said housing, a spring cap on said spring, a two-piece equalizer rockably seated on said cap and bearing against said shoes, an opening centrally of said equalizer, a spring extending through said opening and seated against said cap, a wedge insert bearing against one of said shoes, and an outer wedge follower in complementary wedge engagement with said insert and with integral wedge surfaces on the other of said shoes, the angle of engagement between said follower and said insert being substantially the same as the angle of engagement between said follower and the wedge surface of each of said other shoes, said outer follower being engaged with said last-mentioned spring.

3. In a draft gear, a housing with an open friction end comprising an internal friction surface, friction shoes engaging said surface, spring means for resisting movement of said shoes inwardly with respect to said housing, and outer wedge means for said shoes comprising an outer wedge follower associated therewith and an insert recessed in at least one of said shoes between said shoe and said follower, said follower being spaced from said spring means, said insert bearing against an arcuate face on its associated shoe within the recess therein, said face being so formed and arranged that the extremity thereof closest to said open end is farther from the longitudinal axis of the gear than any other portion of said face, whereby said insert may move relative to its associated shoe outwardly in a direction axially of the gear to momentarily break contact with said shoe upon release of the gear.

4. In a draft gear, a housing having an open end and an internal friction surface flaring toward said end, a plurality of friction shoes engaging said surface, a compression spring, a spring cap thereon, an equalizer seated on said cap and bearing against said shoes, a wedge insert in complementary engagement with an arcuate face on one of said shoes, said insert presenting a wedge surface, wedge surfaces on the other of said shoes, and an outer wedge follower in complementary wedge engagement with all of the said wedge surfaces, said arcuate face being so formed and arranged that the extremity thereof closest to the open end of said housing is farther from the longitudinal axis of the gear than any other portion of said arcuate face.

5. In a draft gear, a housing having an open end and an internal friction surface flaring toward said end, a plurality of friction shoes engaging said surface, a compression spring, a spring cap thereon, an equalizer seated on said cap and bearing against said shoes, a wedge insert in arcuate face engagement with one of said shoes and presenting a wedge surface, wedge surfaces on the other of said shoes, an outer wedge follower in complementary wedge engagement with all of the said wedge surfaces, and an auxiliary release spring extending through an opening in said equalizer and abutting said cap and said outer follower.

6. In a draft gear, a friction housing with an open end, a friction surface within said housing, friction shoes engaging said surface, a compression spring within said housing, a spring cap on said spring, a two-piece equalizer rockably seated on said cap and bearing against said shoes, an opening centrally of said equalizer, a spring extending through said opening and seated against said cap, a wedge insert bearing against one of said shoes, and an outer wedge follower in complementary wedge engagement with said insert and with integral wedge surfaces on the other of said shoes, said outer follower bearing against said last-mentioned spring.

7. In a draft gear, a friction housing with an internal friction surface, friction shoes engaging said surface, resilient means for resisting movement of said shoes inwardly with respect to said housing, a wedge insert received within a recess in one of said shoes in complementary engagement with an arcuate face of said shoe, and an outer follower in complementary wedge engagement with said insert and with integral wedge faces on the other of said shoes, said follower being disposed outwardly of and spaced from said resilient means, said arcuate face merging at the outer extremity thereof with a flat surface lying in a plane tangential to the arc of said last-mentioned face, said extremity being disposed farther from the longitudinal axis of said gear than any other portion of said face.

8. In a draft gear, a housing having an open end with an internal friction surface, four shoes engaging said surface, outer wedge means in complementary wedge engagement with means on said shoes, and a pair of inner and outer springs arranged in series within said housing, a spring cap between said springs, and equalizer means on said cap comprising a two-piece member rockably seated thereon, each of said pieces engaging three of said shoes, said outer spring bearing directly against said wedge means.

9. In a draft gear, an elastic housing with an open friction end comprising an internal friction surface flaring toward said open end, friction elements engaging said surface, spring means for resisting movement of said elements inwardly along said surface, and outer wedge means for said elements comprising an outer wedge follower associated therewith, and an insert recessed in at least one of said elements between said element and said follower, said follower being spaced from said spring means and disposed a substantial distance outwardly thereof in the direction axially of the gear, said insert bearing against an arcuate face on its associated element within the recess therein, said face being so formed and arranged that the axially outer extremity thereof is farther from the axis of the gear than any other portion of said face, whereby said insert may move relative to its associated element outwardly in the direction axially of the gear to momentarily break contact with said element upon contraction of said housing during release of the gear.

10. In a draft gear, a housing having an open end with an internal friction surface, friction shoes engaging said surface, an outer wedge follower engaging said shoes, a plurality of springs arranged in series with a spring plate therebetween, a multi-piece equalizer rockably seated on said plate and engaged with inwardly facing surfaces on said shoes, the outer of said springs bearing against said follower and extending through an opening in said equalizer for engagement with said plate.

EDMUND P. KINNE.

REFERENCES CITED

The following references are of record in the file of this patent:

UNITED STATES PATENTS

| Number | Name | Date |
| --- | --- | --- |
| 2,307,321 | Kulieke | Jan. 5, 1943 |
| 1,571,699 | Brenne | Feb. 2, 1926 |
| 1,555,628 | Brenne | Sept. 29, 1925 |
| 2,205,066 | Pierce | June 18, 1940 |
| 2,257,109 | Davidson | Sept. 30, 1941 |
| 2,129,408 | Davidson | Sept. 6, 1938 |
| 1,853,932 | Schmidt | Apr. 12, 1932 |
| 2,187,333 | Sproul | Jan. 16, 1940 |

Patented Mar. 4, 1947

2,416,928

UNITED STATES PATENT OFFICE 2,416,928

DRAFT GEAR

Edmund P. Kinne, Alliance, Ohio, assignor to American Steel Foundries, Chicago, Ill., a corporation of New Jersey Application November 26, 1943, Serial No. 511,806

10 Claims. (Cl. 213—34)

My invention relates to draft gears and more particularly to a gear of clutch type in which a plurality of friction shoes are received within the open end of a friction barrel or housing and are actuated against spring resistance by outer wedge means. The present invention is an improvement of the generic type of gear illustrated in United States Letters Patent No. 2,307,321, issued January 5, 1943, to F. C. Kulieke.

A further object of my invention is to design a gear of the insert type somewhat similar to that illustrated and described in United States Letters Patent No. 1,555,628, issued September 29, 1925, to Brenne. The present invention is an improvement on the Brenne structure in that the insert and the complementary face of the associated friction shoe are so formed and arranged that the insert is capable of moving outwardly in the direction axially of the gear, thus momentarily breaking contact with the associated friction shoe upon release of the gear.

An object of my invention is to design a gear of the above type in which the outer wedge means comprises an insert member associated with one only of the friction shoes and an outer wedge follower or block in complementary wedge engagement with said insert and the rest of said shoes.

Another object of my invention is to provide an auxiliary release spring, arranged in series with the main compression spring and bearing against the outer follower.

Still another object of my invention is to design a gear of the above type in which a two-piece equalizer is interposed between the main compression spring and the friction shoes for equalizing the pressure exerted thereby against said spring on the closure stroke of the gear.

Figure 1:
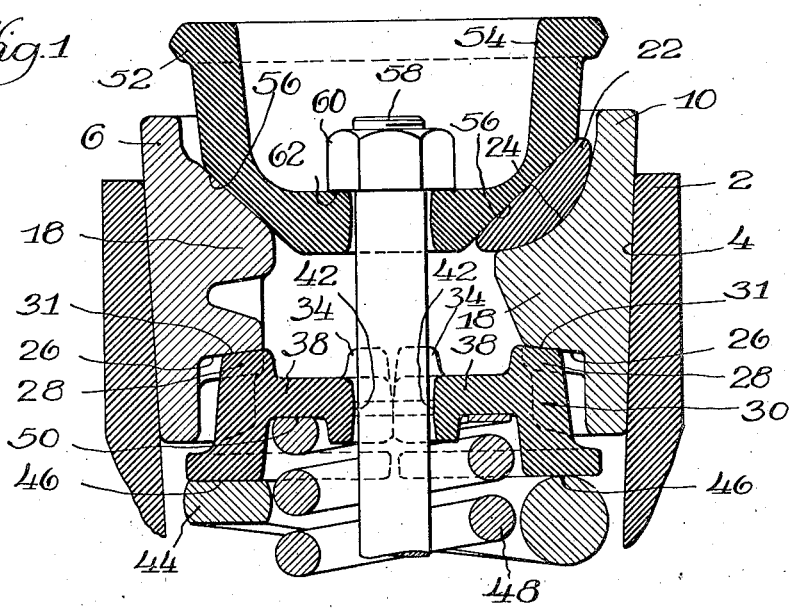
Figure 1 is a fragmentary sectional view of one embodiment of my novel gear, the section being taken in a plane bisecting the gear axially thereof, as indicated by the line 1—1 of Figure 2.
Figure 2:
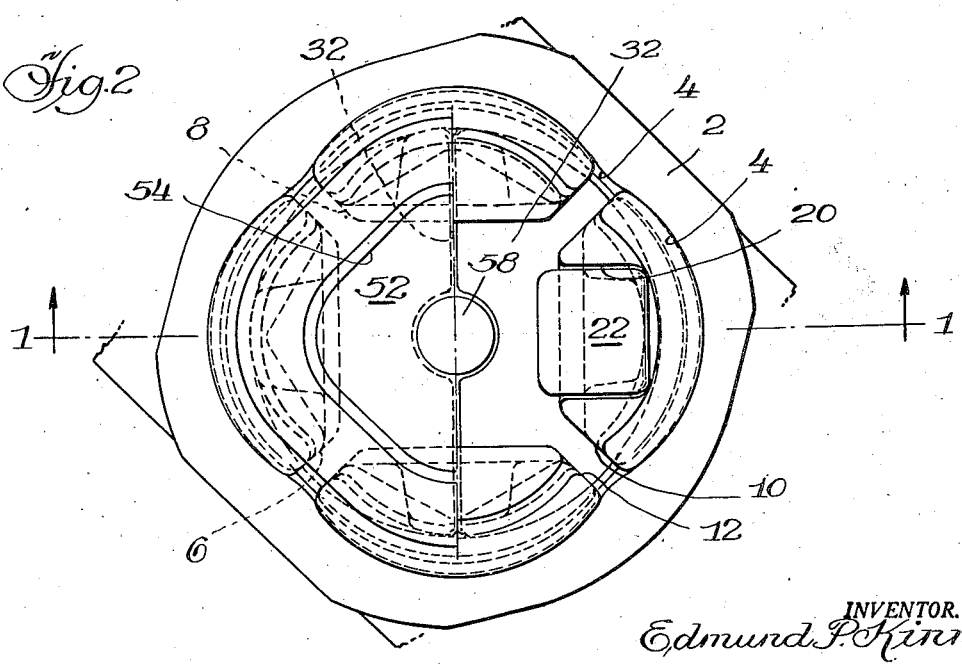
Figure 2 is a plan view of the structure shown in Figure 1, with the outer wedge follower eliminated in the right half of this figure.

Figures 3 to 5 inclusive illustrate the novel equalizer spring cap shown in Figures 1 and 2, Figure 3 being a plan view thereof, Figure 4 being an edge elevation taken from the bottom as seen in Figure 3, and Figure 5 being an edge elevation taken from the right as seen in Figure 3 and 4.

Figures 6 to 9 inclusive illustrate the novel insert type friction shoe shown at the right in Figure 1, Figure 6 being a plan view thereof, Figure 7 being a side elevation taken from the insert engaging face thereof, Figure 8 being a sectional view taken in the plane indicated by the line 8—8 of Figure 7, and Figure 9 being a sectional view taken in the plane indicated by the line 9—9 of Figure 8.

Figure 10:
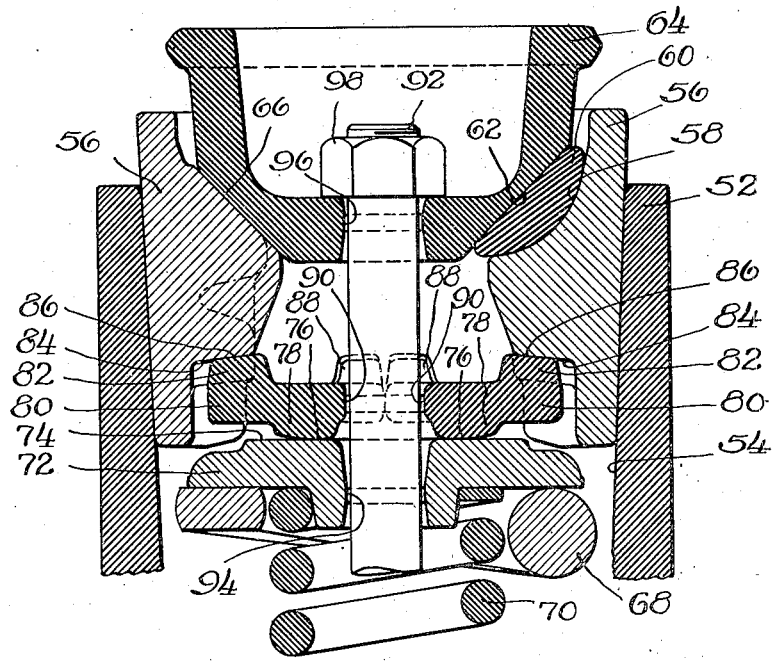
Figure 11:
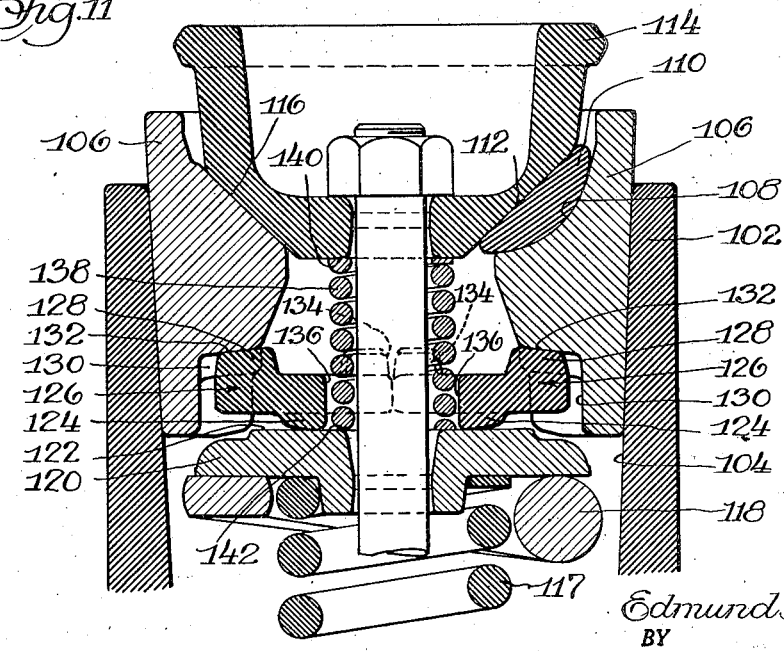

Figure 10 is a sectional view comparable to Figure 1 but showing a modification of my invention, and Figure 11 is a sectional view comparable to Figure 1 and showing another modification of my invention.

Describing my invention in detail and referring first to Figures 1 through 9, my novel draft gear comprises a friction barrel or housing 2 open at one end thereof and provided with an internal friction surface 4 against which are seated four friction shoes 6, 8, 10, and 12, the surface 4 being of scallop-like formation to permit relative rotative adjustment of the shoes during actuating thereof, while at the same time limiting said adjustment, as will be readily understood by those skilled in the art.

The friction shoe 10 is illustrated in detail in Figures 6 to 9 inclusive and comprises the friction wall 14 presenting the arcuate friction surface 16 for engagement with the surface 4 of the housing, said surfaces tapering inwardly, as clearly illustrated in Figures 1 and 8. On the opposite side thereof the shoe 12 is provided with a ledge 18 formed on the outer surface thereof with the recess 20 for the reception of the insert 22.

Within said recess 20 is an arcuate bearing surface 24 in complementary engagement with the insert 22, as best seen in Figure 1. It may be noted that the surface 24 is formed as an arc and merges with the flat surface 25 (Figures 7 and 8), lying in a plane tangential to said arc. In other words, the surface 24 is so formed and arranged that the extremity thereof closest to the open end of the housing is farther from the longitudinal axis of the gear than any other portion of the surface 24. By means of this construction, the insert 22, as the housing 2 contracts upon the release of the gear, is permitted to momentarily break its contact with the shoe 10 by moving relative thereto in a direction axially of the gear and outwardly with respect to the housing. The contraction of the housing 2 upon release of the gear is due to the fact that the surface 4 tapers inwardly toward the inner end of the housing, which is constructed of material such as steel having the characteristic of slight elasticity or resiliency; thus, as the clutch mechanism including the shoes 10, 10 is jammed into the housing along the tapered surface 4 during compression of the gear, the housing stretches or expands slightly, and on the release stroke of the gear the housing contracts, forcing the shoes axially outwardly along the tapered surface 4. For this reason it is believed that my novel arrangement is patentably distinct from that illustrated in the above-mentioned Brenne patent, which shows an insert type gear in which the inserts are incapable of movement relative to the shoes, in a direction axially of the gear, but are only permitted turning movement relative to the shoes, in order to accommodate commercial tolerances in the wedge surfaces on the shoes, the housing and the outer wedge follower.

The inner surface of the ledge portion 18 of the shoe 10 is slotted as at 26 for the reception of a bearer 28 formed on the two-piece equalizer spring cap 30, said bearer 28 being seated as at 31 (Figure 1) against the ledge portion 18.

The two-piece equalizer spring cap 30 consists of a pair of identical members 32, 32, one of said members being shown in detail in Figures 3 to 5 inclusive. The member 32 is generally semi-circular in plan (Figure 3), and on the outer face and adjacent the perimeter thereof is formed the before-mentioned bearer 28. At each end of the member 32 and on the outer face thereof are the end bearers 34, 34 cooperating with the associated friction shoes, as hereinafter described. The outer perimeter of the member 32 is defined by the semi-annular flange 36 projecting axially inwardly with respect to the central plate-like portion 38 which is formed with the semi-annular flange 40 defining the semi-circular recess 42 in the edge of the member 32 adjacent the other member 32 forming therewith the two-piece equalizer spring cap 30, the recesses 42, 42 forming a central opening through the spring cap 30 for the reception of an associated retaining bolt as hereinafter described.

Referring now to Figure 1, it will be seen that the compression spring 44 mounted within the housing 2 in usual manner seats as at 46 against the inner surfaces of the flanges 36, 36 and the compression spring 48 sleeved within the spring 44 seats as at 50 against the plate portions 38, 38 of the respective members 32, 32, constituting the spring cap 30.

Each friction shoe 6, 8 and 12 is substantially identical with the shoe 10, except that the ledge 18 thereof is formed without the recess 20 and is in direct engagement with the outer follower, as hereinafter described. The inner surface of the ledge 18 of each shoe 6, 8 and 12 is provided with the slot or recess 26 corresponding to the before-mentioned slot 26 of the shoe 10, and it will be understood from a consideration of Figures 1 and 2 that the bearer 28 of each spring cap member 32 seats as at 31 against the associated shoe 6 or 10 within the slot 26 thereof for interlocking engagement therewith, a pair of bearers 34, 34 of the respective members 32, 32 being received within the slot 26 of each shoe 8 and 12 for interlocking engagement therewith, as more fully described in the above-mentioned patent. Thus each shoe 6 and 10 bears against one spring cap member 32 and each shoe 8 and 12 bears against both members 32, 32 whereby equalization is afforded of the pressure exerted by the shoes against the compression release springs 44 and 48.

The outer follower or block 52 is a cup-like member comprising the central recess 54 and a plurality of wedge faces 56, 56. As will be understood from a consideration of Figure 1, one of the wedge faces 56 is seated against a complementary surface on the insert member 22, and the rest of the wedge faces 56, 56 bear directly against complementary surfaces on the ledges 18, 18 of the respective shoes 6, 8 and 12. It may be noted that all of the wedge faces 56, 56 are at approximately the same angle with respect to the longitudinal axis of the gear, whereby on the compression stroke of the device all of the friction shoes move inwardly against the surface 4 at approximately the same rate.

It will be understood, however, that each wedge face 56 may be arranged at any desired angle.

A bolt 58 is mounted within the housing 2 in the usual manner and a nut 60 (Figure 1) is threaded on the outer extremity of the bolt and seats as at 62 against the follower 52 within the recess 54 to limit outward movement of the follower and shoes on the release stroke of the gear.

It will be understood that the insert 22 is operable to prevent the parts from sticking on the closure stroke of the gear, thus insuring prompt release thereof.

A modification of my invention is illustrated in Figure 10, wherein the housing 52 comprises the internal friction surface 54 against which are seated complementary faces of the friction shoes 56, 56, one of said shoes being provided with an arcuate recess 58 for the reception of a wedge insert 60, having complementary wedge engagement at 62 with the outer wedge follower or block 64. The other shoes are in direct complementary wedge engagement as at 66 with said follower.

Seated on the telescoped compression release springs 68 and 70 is a spring cap 72 presenting a flat outer surface 74 for rocking engagement as at 76 with bearing pads 78, 78 formed on the inner faces of the equalizer members 80, 80, constituting a two-piece equalizer, each of the members 80 having a bearer 82 received within a complementary recess 84 in the associated friction shoe and bearing thereagainst as at 86. At each end thereof each member 80 is provided with a bearer 88, a pair of the bearers 88, 88 being received within each of the associated friction shoes in a manner similar to that described for Figures 1 and 2.

The adjacent faces of the members 80, 80 are provided with the semi-circular recesses 90, 90 defining an opening for the reception of the retaining bolt 92, which extends through the opening 94 in the spring cap 72 and through an opening 96 in the outer wedge follower 64, the outer end of the bolt 92 being provided with a nut 98, as in the previously described embodiment.

It will be understood that the gear illustrated in Figure 10 is substantially identical with that illustrated in Figure 1, except for the fact that the equalizer members 80, 80 are rockably seated on a spring cap 72, whereas in Figure 1 the equalizer members 32, 32 are formed as spring caps and seat directly against the compression springs.

Another modification of my invention is illustrated in Figure 11, wherein the housing 102 is formed with the internal friction surface 104 against which are seated the friction shoes 106, 106, one of said shoes being provided with the arcuate recess 108 within which is positioned the wedge insert member 110 in complementary arcuate face engagement with said shoe, the outer surface of said insert being in complementary wedge engagement at 112 with the outer wedge